United States Patent [19]

Oliver

[11] Patent Number: 4,890,102
[45] Date of Patent: Dec. 26, 1989

[54] VISUAL DISPLAY FOR COMMUNICATION NETWORK MONITORING AND TROUBLESHOOTING

[75] Inventor: Christopher J. Oliver, Rochester, N.H.

[73] Assignee: Cabletron, Inc., Rochester, N.H.

[21] Appl. No.: 54,311

[22] Filed: May 26, 1987

[51] Int. Cl.[4] .............................................. H04Q 9/00
[52] U.S. Cl. ........................... 340/825.17; 340/825.06; 340/815.03; 455/347
[58] Field of Search ...................... 340/825.06, 825.17, 340/815.03, 752, 760, 762, 766, 782, 635, 653; 375/7; 307/362, 363; 371/29; 455/347

[56] References Cited

U.S. PATENT DOCUMENTS

| | | | |
|---|---|---|---|
| 3,701,945 | 10/1972 | Gallant et al. | |
| 3,826,908 | 7/1974 | Weathers et al. | 235/153 R |
| 4,080,569 | 3/1978 | Cameron | |
| 4,255,748 | 3/1981 | Bartlett | 340/661 |
| 4,384,363 | 5/1983 | Lipcon | 455/58 |
| 4,481,626 | 11/1984 | Boggs et al. | 370/85 |
| 4,498,716 | 2/1985 | Ward | 339/17 R |
| 4,580,274 | 4/1986 | Debany, Jr. et al. | 275/10 |
| 4,594,705 | 6/1986 | Yahata et al. | 370/67 |
| 4,602,364 | 7/1986 | Herman et al. | 370/85 |
| 4,610,010 | 9/1986 | Claessen et al. | 370/32 |
| 4,631,698 | 12/1986 | Walsh et al. | 364/900 |
| 4,631,733 | 12/1986 | Spiesman | 375/55 |
| 4,649,548 | 3/1987 | Crane | 375/7 |
| 4,663,757 | 5/1987 | Huang et al. | 370/85 |
| 4,665,519 | 5/1987 | Kirchner et al. | 370/94 |

FOREIGN PATENT DOCUMENTS

| | | |
|---|---|---|
| 2532091 | 2/1984 | France . |
| 0230346 | 12/1984 | Japan . |
| 0000137 | 1/1985 | Japan . |
| 0198931 | 10/1985 | Japan . |
| 0254943 | 12/1985 | Japan . |

OTHER PUBLICATIONS

Shotwell, "The Ethernet Sourcebook", 1985, third edition, pp. 295-298 & 413-418.
Am7996 data sheet, Advanced Micro Devices, Dec. 1985.

Primary Examiner—Donald J. Yusko
Assistant Examiner—Edwin C. Holloway, III
Attorney, Agent, or Firm—Wolf, Greenfield & Sacks

[57] ABSTRACT

A communication network transceiver assembly for interfacing between a communication bus and a host system includes a transceiver circuit for coupling data signals to and from the communication bus, a housing for containing the transceiver circuit and several indicator LED's which indicate the operating status of the assembly. The indicator LED's are an integral part of the transceiver assembly and assist in troubleshooting and maintenance. The indicator LED's display the status of transmit and receive signals, collision presence, heartbeat test enable and power. Those LED's which indicate time varying digital signals are driven by interface circuits which include an asymmetrical difference amplifier for sensing the time varying signal, a pulse stretcher and an LED driver.

8 Claims, 5 Drawing Sheets

4,890,102

VISUAL DISPLAY FOR COMMUNICATION NETWORK MONITORING AND TROUBLESHOOTING

FIELD OF THE INVENTION

This invention relates to transceiver circuitry for interfacing a host system to a digital local area network and, more particularly, to transceiver apparatus having a visual display to assist in monitoring and troubleshooting.

BACKGROUND OF THE INVENTION

Local area networks have been developed for digital communication between computers and other types of digital systems. The networks have been standardized to some extent to facilitate communication between equipment of different manufacturers. Among these networks are Ethernet and IEEE 802.3. Ethernet is a registered trademark of the Xerox Corporation. These systems include a communication bus which carries two-way digital communications. A host system is connected to the network by means of a transceiver circuit which transmits data from the host system onto the communication bus and receives data from the communication bus and forwards it to the host system. The transceiver circuit also generally includes circuitry for detecting collisions between transmitted and received signals. In addition, the transceiver circuit may contain circuitry for testing the collision presence detector. This test is known as the "heartbeat" test.

In the installation, maintenance and troubleshooting of the transceiver portion of a network system, elaborate diagnostic test instruments and software can be utilized to assist in verifying proper operation and in pinpointing problems. However, we have found that in many cases, the problems are relatively simple and that the use of complex test instruments and software is unnecessary. However, in the past, simple and easy-to-interpret transceiver troubleshooting devices have not been available. One of the difficulties in providing a simple and low-cost indicator of transceiver operation is that the signals carried on the network bus are high speed digital data signals which cannot readily be interpreted except with the use of complex and expensive test equipment to synchronize and evaluate the data signals.

It is a general object of the present invention to provide improved transceiver apparatus for interfacing between a host system and a communication bus.

It is a another object of the present invention to provide a communication transceiver assembly with visual indicators which readily indicate the operating status of the assembly.

It is a further object of the present invention to provide a communication network transceiver assembly with a simple and low-cost means to assist troubleshooting and maintenance.

SUMMARY OF THE INVENTION

According to the present invention, these and other objects and advantages are achieved in a communication network transceiver assembly for interfacing between a communication bus and a host system. The transceiver assembly comprises transceiver circuit means for coupling a transmit signal from the host system onto the bus and for coupling data from the bus to form a receive signal supplied to the host system, a housing for containing the transceiver circuit means and indicator means for providing visible displays of the presence of the transmit signal and the receive signal. The indicator means is an integral part of the transceiver assembly.

The indicator means can comprise a transmit LED, a transmit LED circuit responsive to the transmit signal for illuminating the transmit LED, a receive LED and a receive LED circuit responsive to the receive signal for illuminating the receive LED. In a preferred embodiment of the invention, the transmit LED circuit and the receive LED circuit each comprise an asymmetrical difference amplifier for providing an output in response to a pulsed differential input signal of prescribed amplitude, a pulse stretcher circuit responsive to the output of the difference amplifier for providing a pulse of prescribed duration and an LED driver circuit responsive to the pulse of prescribed duration for illuminating the respective LED.

According to another aspect of the invention, the transceiver circuit means further includes collision presence means for generating a collision signal, and the indicator means further includes a collision LED and a collision LED circuit responsive to the collision signal for illuminating the collision LED. The transceiver circuit means can further include means responsive to a heartbeat enable signal for testing the collision presence means, and the indicator means can further include a heartbeat LED and a heartbeat LED circuit responsive to the heartbeat enable signal for illuminating the heartbeat LED. The indicator means preferably further includes a power LED for monitoring power supplied to the transceiver circuit means.

The indicator LED's provide an inexpensive and easily-interpreted visual display of the transceiver operation. Many trouble conditions can be identified by interpreting the states of the LED indicators on the transceiver housing without resorting to more elaborate and time-consuming troubleshooting procedures.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
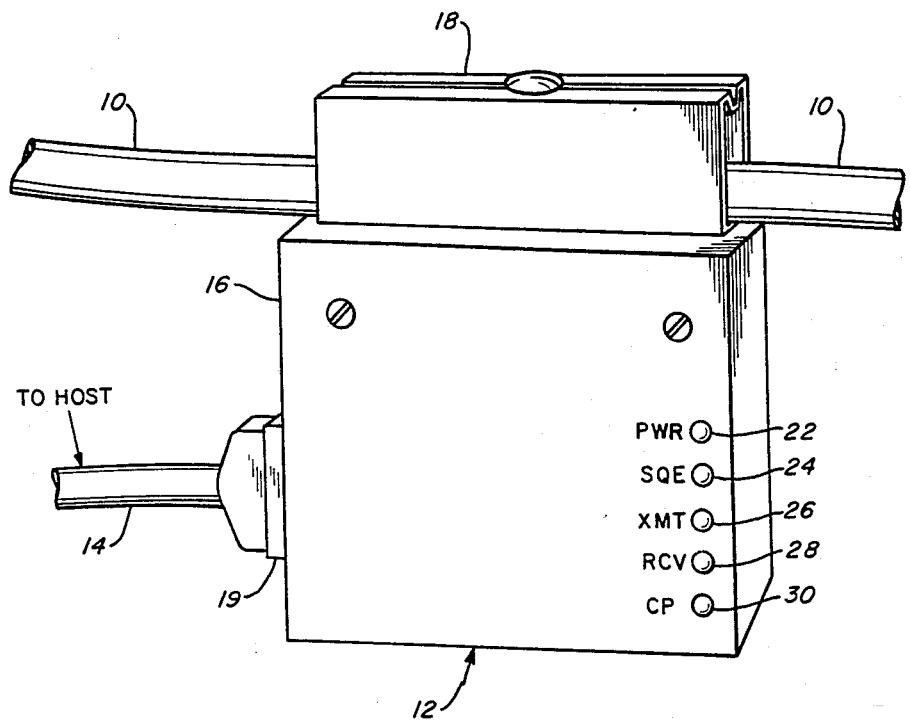
FIG. 1 is a perspective view of a communication network transceiver assembly in accordance with the present invention.

A communication network transceiver assembly in accordance with the present invention is shown in FIG.

1. A communication bus 10 is typically a coaxial cable and interconnects a number of stations on a communication network. Each station includes a transceiver assembly and a host system. Transmitted data and received data are multiplexed on communication bus 10. A transceiver assembly 12 interconnects the communication bus 10 and a host system cable 14. A host system (not shown) such as a computer, a terminal or other device is connected to the cable 14 and communicates with other stations on the network through the transceiver assembly 12.

The transceiver assembly 12 includes a housing 16 which contains transceiver circuitry as described hereinafter. A bus connector 18 and a host system connector 19 are mounted on the housing 16. The housing 16 can be any suitable material for enclosing a circuit board.

Figure 2A:
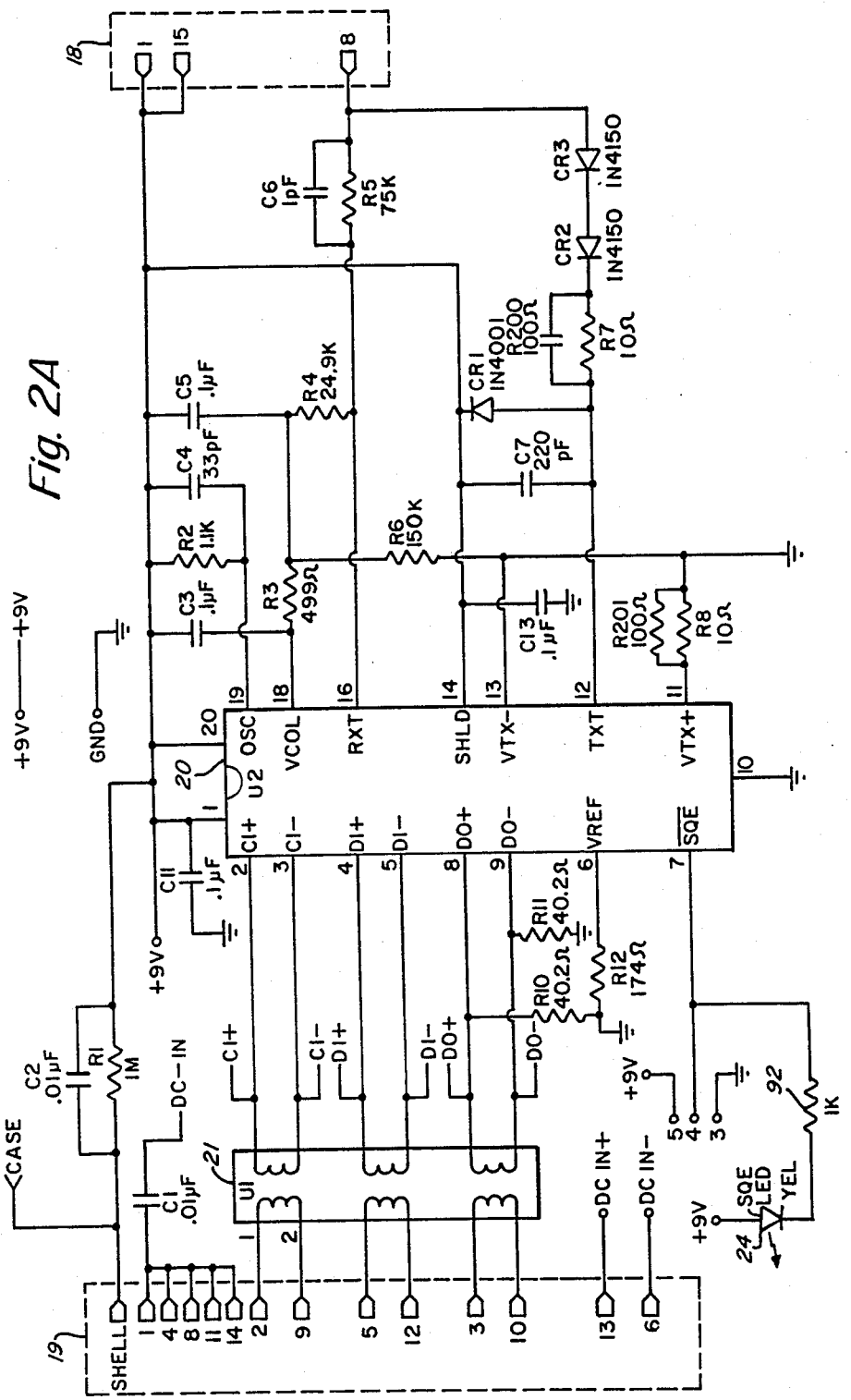
FIG. 2A is a schematic diagram of a conventional transceiver circuit including an SQE LED in accordance with the present invention.

The transceiver circuitry for interfacing the host system to the communication bus 10 is shown in schematic form in FIG. 2A. The major component of the transceiver circuit is a transceiver integrated circuit 20 which can be an AM7996DC Ethernet transceiver chip manufactured by Advanced Microdevices. The transceiver also includes a pulse transformer 21 which can be a type PE64107 available from Pulse Engineering. Also included in the transceiver circuit are resistors R1-R8, R10-R12, R200 and R201; capacitors C1-C7, C11 and C13; and diodes CR1-CR3. The interconnection of these circuit elements to form a transceiver circuit is generally known and is described in the AMD 7996 Data Sheets. Therefore, the details of this circuit will not be described further. The circuitry of FIG. 2A is preferably on a printed circuit board mounted within the housing 16.

In accordance with the present invention, the transceiver assembly 12 further includes indicator circuitry for sensing the operation of the transceiver circuit and providing a visible display of operating conditions as an integral part of the transceiver assembly. The indicator circuitry is simple and low in cost and provides a reliable indication of certain circuit problems without the necessity for additional test equipment or test software. The indicator circuitry includes LED's 22-30 and associated drive circuitry as described hereinafter.

Mounted in one wall of the housing 16 is a group of light emitting diodes (LED's) to indicate the operating status of the transceiver assembly as described hereinafter. A PWR LED 22 indicates that the transceiver assembly is receiving d.c. power from the host system. An SQE LED 24 indicates that the heartbeat test of the collision detection circuitry is enabled. An XMT LED 26 indicates the presence of transmitted data from the host system. A RCV LED 28 indicates data being received by the host system. A CP LED 30 indicates that the collision detection circuitry has found the presence of a collision between the transmitted and received data. It will be understood that the LED's 22-30 can be mounted to a wall of housing 16 or can be mounted on an underlying circuit board in alignment with holes in the housing wall. Also, the LED's 22-30 can be replaced with any suitable type of indicator lamp. It is preferred that the LED's have different colors for easy identification.

Figure 2B:
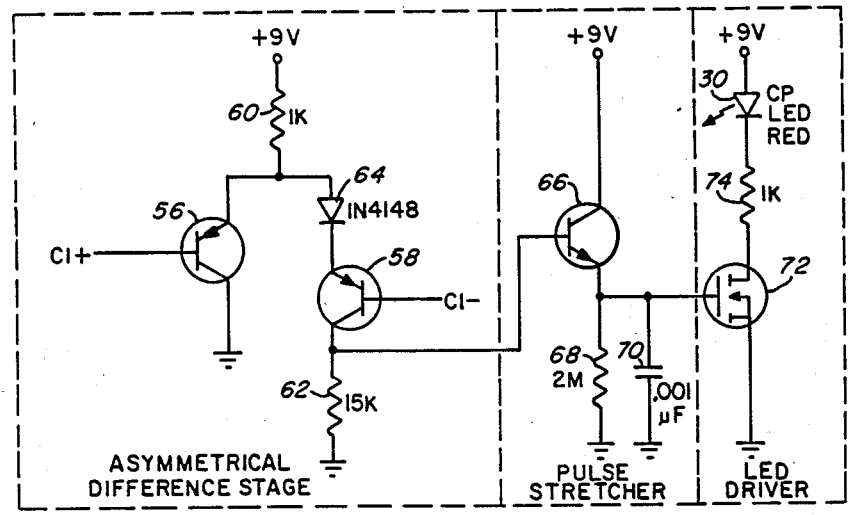
FIG. 2B is a schematic diagram of a collision presence indicator.
Figure 2C:
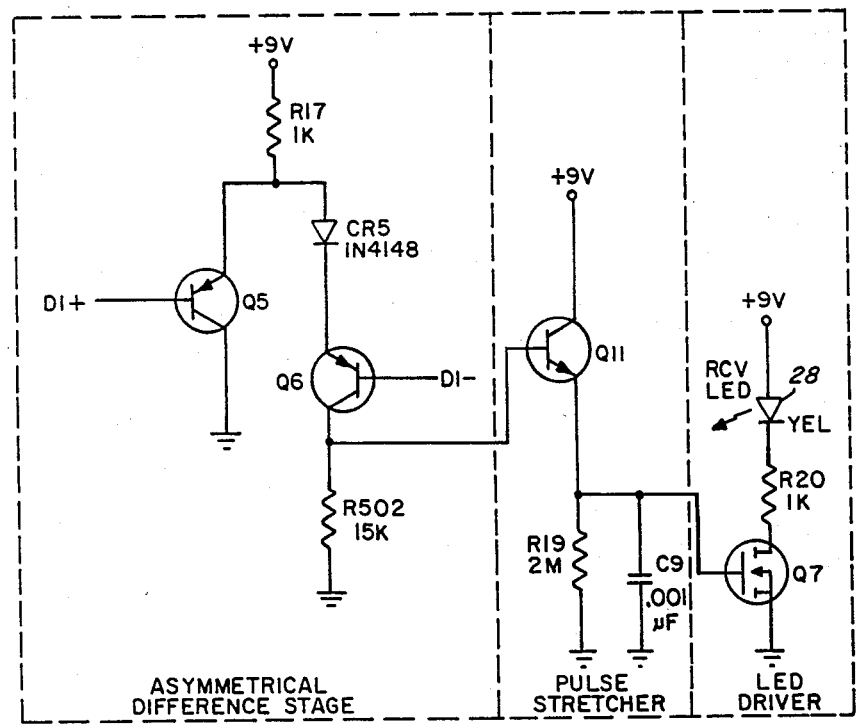
FIG. 2C is a schematic diagram of a receive signal indicator.
Figure 2D:
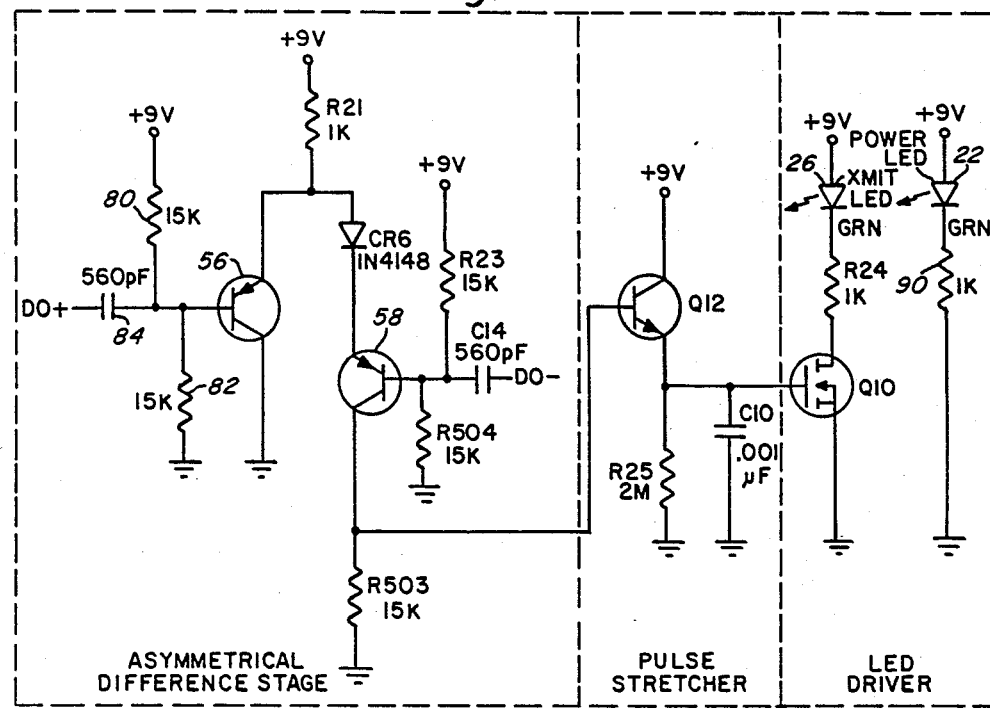
FIG. 2D is a schematic diagram of a transmit signal indicator and a power indicator.

The indicator circuitry includes CP LED 30 and associated interface circuitry shown in FIG. 2B, RCV LED 28 and associated interface circuitry shown in FIG. 2C, XMT LED 26 and associated interface circuitry shown in FIG. 2D, PWR LED 22 shown in FIG. 2D and SQE LED 24 shown in FIG. 2A.

The interface circuitry for CP LED 30 (FIG. 2B) includes an asymmetrical difference amplifier, or stage 50 which supplies an output to a pulse stretcher 52. An output pulse from pulse stretcher 52 is supplied to an LED driver 54 which supplies current through the LED 30 and illuminates it when a collision condition is present.

The asymmetrical difference stage 50 receives differential input signals $C1+$ and $C1-$, which indicate the collision condition, from pins 2 and 3, respectively, of the transceiver integrated circuit 20. The two inputs $C1+$ and $C1-$ are symmetrical about one-half the supply voltage. The $C1+$ signal is supplied to the base of a PNP transistor 56 and the $C1-$ signal is supplied to the base of a PNP transistor 58. The collector of transistor 56 is connected to ground and its emitter is connected through a resistor 60 to the supply voltage $V_{cc}$, typically +9 volts. The collector of transistor 58 is connected through a resistor 62 to ground and its emitter is connected to the cathode of a diode 64. The anode of diode 64 is connected to the junction of resistor 60 and the emitter of transistor 56.

The output of the difference stage 50, taken from the collector of transistor 58, is connected to the base of a PNP transistor 66 in the pulse stretcher 52. The collector of transistor 66 is connected to the supply voltage, $V_{cc}$, and the emitter of transistor 66 is connected through a resistor 68 to ground. A capacitor 70 is coupled in parallel with resistor 68 between the emitter of transistor 66 and ground, so that resistor 68 and capacitor 70 form a timing network. The output of the pulse stretcher 52, taken from the emitter of transistor 66, is connected to the gate of an MOS field-effect transistor 72. The source of transistor 72 is connected to ground, and its drain is connected through a resistor 74 to the cathode of CP LED 30. The anode of CP LED 30 is connected to the supply voltage $V_{cc}$.

When no signal activity is present, the lines $C1+$ and $C1-$ are both maintained at approximately $V_{cc}/2$ by the driving source in the transceiver integrated circuit 20. Because of the voltage drop $V_{D64}$ provided by the diode 64, all current from emitter resistor 60 is steered through transistor 56 to ground. Therefore, transistor 58 is off and its collector voltage $V_{c58}$ is at ground. This holds transistors 66 and 72 off.

Figure 3:
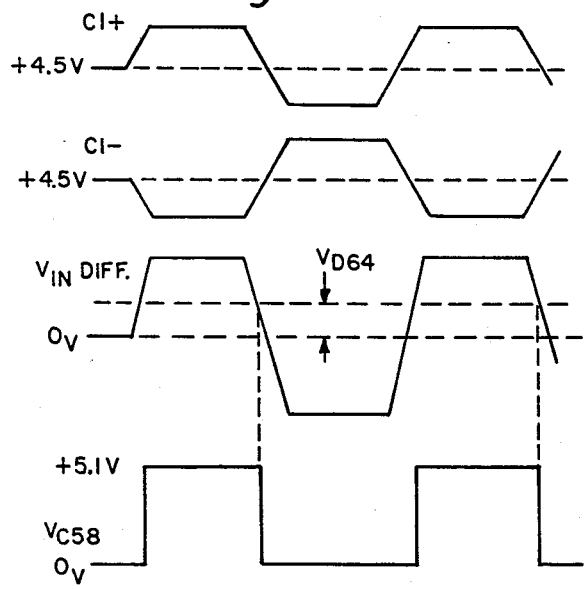
FIG. 3 is a timing diagram illustrating operation of the asymmetrical difference stages.

We may define $V_{IN}$ as the differential input voltage applied between $C1+$ and $C1-$, with a positive $V_{IN}$ corresponding to a positive voltage change at $C1+$ and an accompanying negative voltage change at $C1-$. For a negative $V_{IN}$, the current through resistor 60 increases. The current increase is steered to ground through transistor 56, and no change occurs at the collector of transistor 58. For a positive $V_{IN}$ sufficient to overcome the voltage threshold imposed by diode 64, the current through resistor 60 is steered to transistor 58, and the collector voltage $V_{c58}$ rises until transistor 58 saturates. Under these conditions, $V_{c58} = V_{IN} + V_{D64}$. Therefore, the input stage converts positive portions of the differential input voltage $V_{IN}$ which exceed the threshold value (about 0.5 volt) imposed by diode 64 into single-ended output pulses at the collector of transistor 58. Waveforms for operation of the difference stage 50 are shown in FIG. 3.

The pulse stretcher 52 consists of emitter-follower transistor 68 driving the parallel RC network comprised of resistor 68 and capacitor 70. Under quiescent conditions, capacitor 70 is discharged and the output voltage to the gate of driver transistor 72 is zero. When signal activity commences and a voltage pulse is applied to the base of transistor 66, emitter current from transistor 66 charges capacitor 70. Since the current from transistor 66 is limited by the available base drive and the transistor current gain, capacitor 70 may not charge up to the full voltage afforded by $V_{c58}$ during a single pulse. When resistor 68 has a value of 2 megohms and capacitor 70 has a value of 0.001 microfarad, it requires three to four 15-nanosecond pulses at a 10 MHz repetition rate to fully charge capacitor 70. When $V_{c58}$ goes to zero, the base-emitter junction of transistor 66 is reverse biased by the voltage on capacitor 70. This presents no problem as long as the base-emitter reverse breakdown voltage of transistor 66 is not exceeded.

During the time when $V_{c58}$ is zero, the voltage of capacitor 70 decays exponentially with a time constant determined by resistor 68 and capacitor 70. This time constant is nominally set at 2 milliseconds. At the high pulse repetition rate encountered during a transmission burst, the capacitor voltage droop which occurs between pulses is so small that for all practical purposes, the capacitor voltage remains constant at one diode drop less than the maximum $V_{c58}$ value for the duration of the signal burst. When the signal burst ends, the effective duration of pulse stretching after the burst depends not only on the RC time constant, but also on the gate threshold of transistor 72. For typical devices, this threshold can range from 0.5 volt to 2.0 volts. The corresponding pulse stretch duration for a time constant of 2 milliseconds and $V_{c58}max=5.1$ volts ranges from 4.6 milliseconds to 1.9 milliseconds. This variation has no impact on the effectiveness of the indicator and monitoring functions. As long as the voltage on capacitor 70 remains above the threshold voltage, transistor 72 is turned on and current flows through LED 30 and resistor 74, causing the LED 30 to be illuminated.

The interface circuitry for the RCV LED 28 shown in FIG. 2C is identical to the interface circuitry shown in FIG. 2B and described above. The inputs to the interface circuitry of FIG. 2C are differential input signals D1+ and D1− from pins 4 and 5, respectively, of transceiver integrated circuit 20. When this signal is active, the host system is receiving a signal from the communication bus 10.

The interface circuitry for driving XMT LED 26 shown in FIG. 2D is the same as interface circuitry shown in FIG. 2B and described above except that the input signals to the asymmetrical difference stage are coupled through an RC network to isolate the d.c. level of the source.

The inputs to the interface circuitry of FIG. 2D are differential input signals D0+ and D0− from pins 8 and 9, respectively, of transceiver integrated circuit 20. When this signal is active, the host system is transmitting data onto the communication bus 10. The signals D0+ and D0− from transceiver integrated circuit 20 are not at the correct d.c. level for direct coupling to the asymmetrical difference stage. Resistive dividers are used to establish d.c. levels at the inputs of the difference stage. Referring to FIG. 2D, a resistor 80 is connected between the base of transistor 56 and supply voltage $V_{cc}$, and a resistor 82 is connected between the base of transistor 56 and ground. For equal values of resistors 80 and 82, the voltage at the base of transistor 56 is established at $V_{cc}/2$ (assuming the transistor 56 base current is negligible). The input signal D0+ is coupled through a capacitor 84 to the base of transistor 56. An identical circuit is used for coupling the signal D0− to the base of transistor 58. The time constant of the RC coupling circuits should be long compared to the maximum pulse duration on the input line, for example, at least a factor of 20–50% larger. The remainder of the interface circuit of FIG. 2D is the same as the circuit of FIG. 2B, described above.

The PWR LED 22 is shown in FIG. 2D. It is coupled in series with a resistor 90 between supply voltage $V_{cc}$ and ground. As long as the supply voltage $V_{cc}$ is present, the PWR LED 22 remains illuminated.

The SQE LED 24 is illustrated in FIG. 2A. It is connected in series with a resistor 92 between supply voltage $V_{cc}$ and pin 7 of transceiver integrated circuit 20. When the SQE heartbeat test is enabled by grounding pin 7 of integrated circuit 20, the LED 24 is illuminated. When the SQE heartbeat test is not enabled, LED 24 is not illuminated.

The degree of pulse stretching discussed above is adequate to monitor signal activities of the transceiver for most practical circumstances. A single 2 millisecond turn-on of the LED appears as a brief but visible flicker. In some circumstances (for example, monitoring spurious pulses) it is desirable to detect a single short pulse. As indicated above, the circuit of FIG. 2B does not supply sufficient current drive to charge capacitor 70 from a single input pulse. Also, it is desirable in some circumstances to increase the pulse stretching time by increasing capacitor 70, again requiring more current drive. This can be provided by means of the pulse stretch circuit modifications shown in FIGS. 4A–4D.

Figure 4A:
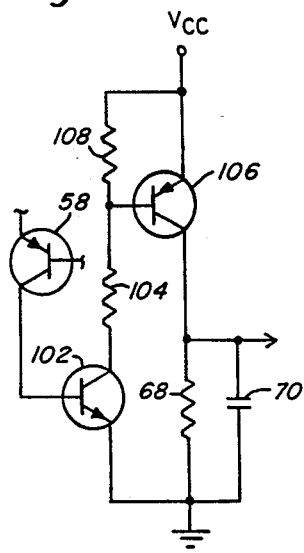
FIGS. 4A-4D illustrate alternate embodiments of the pulse stretcher circuit shown in FIGS. 2B-2D.

In each of the circuits shown in FIGS. 4A–4D, an additional transistor is utilized to increase the current supplied to the RC pulse stretching network. In FIG. 4A, the collector of transistor 58 is connected to the base of an NPN transistor 102. The emitter of transistor 102 is connected to ground and its collector is connected through a resistor 104 to the base of a PNP transistor 106. The base of transistor 106 is connected to supply voltage $V_{cc}$ through a resistor 108. The emitter of transistor 106 is connected directly to supply voltage $V_{cc}$ and its collector is connected to the RC pulse stretching network. When the collector voltage $V_{c58}$ increases, transistors 102 and 106 both turn on and current is supplied through transistor 106 to the RC network.

Figure 4B:
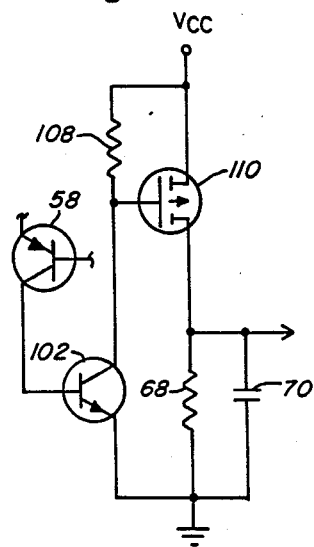
Figure 4C:
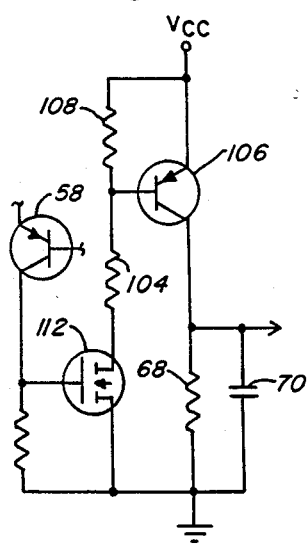
Figure 4D:
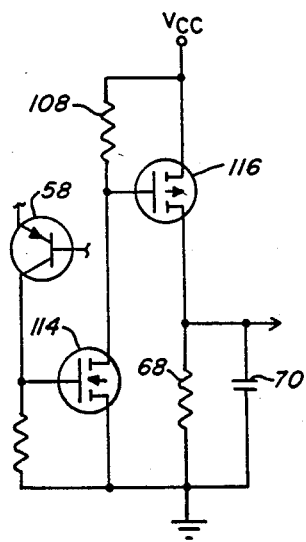

The circuit of FIG. 4B is similar to the circuit of 4A except that PNP transistor 106 has been replaced by a MOSFET transistor 110 and resistor 104 has been eliminated. The circuit of FIG. 4C is the same as the circuit of FIG. 4A except that the NPN transistor 102 has been replaced by a MOSFET transistor 112. The circuit of FIG. 4A is the same as the circuit of FIG. 4A except that transistors 102 and 106 have been replaced by MOSFET transistors 114 and 116, respectively, and resistor 104 has been eliminated. Each of the circuits of FIGS. 4A–4D operate in a similar manner to increase the current drive to the RC pulse stretching network.

While there has been shown and described what is at present considered the preferred embodiments of the present invention, it will be obvious to those skilled in the art that various changes and modifications may be made therein without departing from the scope of the present invention as defined by the appended claims.

What is claimed is:

1. A communication network transceiver assembly for interfacing between a communication bus and a host system, said transceiver assembly comprising:

transceiver circuit means for coupling a transmit signal from the host system onto the bus and for coupling data from the bus to form a receive signal supplied to the host system;

a housing for containing said transceiver circuit means; and indicator means for providing on said housing visible displays of the presence of said transmit signal and said receive signal, said indicator means comprising a transmit LED, a transmit LED circuit responsive to said transmit signal for illuminating said transmit LED, a receive LED and a receive LED circuit responsive to said receive signal for illuminating said receive LED, said transmit LED circuit and said receive LED circuit each comprising an asymmetrical difference amplifier for providing an output in response to a differential input signal of prescribed amplitude, said differential input signal comprising the respective transmit signal or receive signal, a pulse stretcher circuit responsive to the output of said difference amplifier for providing a pulse of prescribed duration, and an LED driver circuit responsive to said pulse of prescribed duration for illuminating the respective LED.

2. A transceiver assembly as defined in claim 1 wherein said transceiver circuit means further includes collision presence means for generating a collision signal and wherein said indicator means further includes a collision LED and a collision LED circuit responsive to said collision signal for illuminating said collision LED.

3. A transceiver assembly as defined in claim 2 wherein said transceiver circuit means further includes means responsive to a heartbeat enable signal for testing said collision presence means and wherein said indicator means further includes a heartbeat LED and a heartbeat LED circuit responsive to said heartbeat enable signal for illuminating said heartbeat LED.

4. A transceiver assembly as defined in claim 3 wherein said indicator means further includes a power LED for monitoring power supplied to said transceiver circuit means.

5. A transceiver assembly as defined in claim 2 wherein said collision LED circuit comprises an asymmetrical difference amplifier for providing an output in response to a differential input signal of prescribed amplitude, said differential input signal comprising said collision signal, a pulse stretcher circuit responsive to the output of said difference amplifier for providing a pulse of prescribed duration, an LED driver circuit responsive to said pulse of prescribed duration for illuminating the respective LED's.

6. A transceiver assembly as defined in claim 1 wherein the pulse stretcher circuit provides a pulse on the order of about 2 milliseconds.

7. A transceiver assembly as defined in claim 1 further including an RC network for a.c. coupling of said differential input signal to said asymmetrical difference amplifier.

8. A transceiver assembly as defined in claim 1 wherein said asymmetrical difference amplifier comprises a differential amplifier having parallel current branches, one of said branches having a diode connected in series therewith to establish the prescribed amplitude of input signal required to provide an output.

* * * * *